United States Patent [19]

Anderson

[11] Patent Number: 4,658,709

[45] Date of Patent: Apr. 21, 1987

[54] MULTITRACK APPARATUS FOR FRYING FOOD

[76] Inventor: Edward M. Anderson, 2620 E. Medicine Lake Blvd., Minneapolis, Minn. 55441

[21] Appl. No.: 614,947

[22] Filed: May 29, 1984

[51] Int. Cl.$^4$ .............................................. A47J 37/12
[52] U.S. Cl. ........................................ 99/406; 99/407; 99/408; 99/409; 426/438
[58] Field of Search .............. 99/403, 407, 409, 405, 99/406, 408, 354; 426/438, 523

[56] References Cited

U.S. PATENT DOCUMENTS

| | | | |
|---|---|---|---|
| 1,401,945 | 12/1921 | Morris | 99/406 |
| 2,047,262 | 7/1936 | Gibson | 99/405 |
| 2,160,123 | 5/1939 | Carpenter | 99/354 |
| 3,446,138 | 5/1969 | Hasten | 99/408 X |

FOREIGN PATENT DOCUMENTS 449044  6/1948  Canada ................... 99/406

Primary Examiner—Billy J. Wilhite
Attorney, Agent, or Firm—Henry C. Kovar

[57] ABSTRACT

A double track deep fat food fryer has a cooking vat, a central divider wall dividing the vat into a pair of side-by-side elongate cooking tracks, a dispenser above an upstream end of the vat for dispensing discrete pieces of food product to be fryed, a paddlewheel for propelling fat along the lengths of both cooking tracks, a flipper in each cooking track to flip the food pieces as they travel through the track, a remover to remove the food pieces from a downstream end of the tracks, a movable diverter barrier on an upstream end of the divider wall which diverts food pieces alternately between the cooking tracks, and an actuation linkage underneath the cooking tracks that connects the barrier, flipper and remover together and to a common motor. A method of deep fat frying a plurality of discrete pieces of food has the steps of dispensing food pieces into the vat, propelling the pieces downstream, sending the pieces alternately down respective cooking tracks, and keeping the sequential pieces isolated from each other as they cook.

7 Claims, 10 Drawing Figures

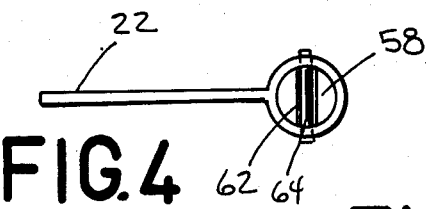
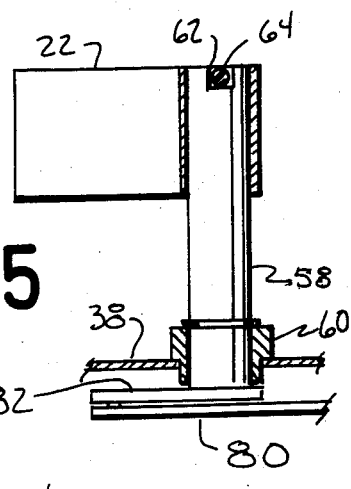

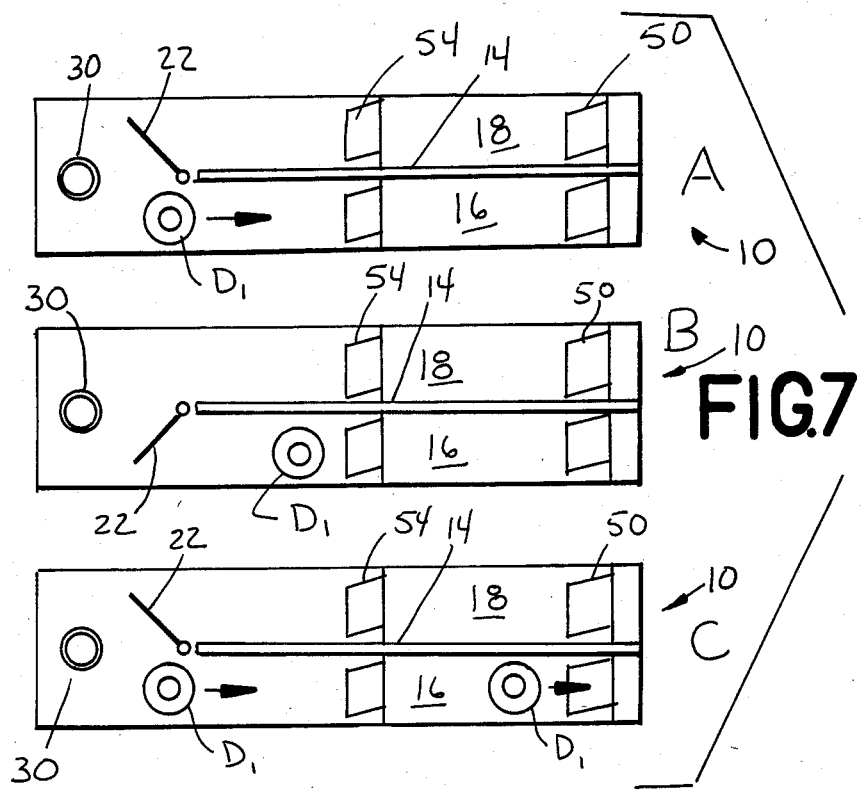
FIG.7
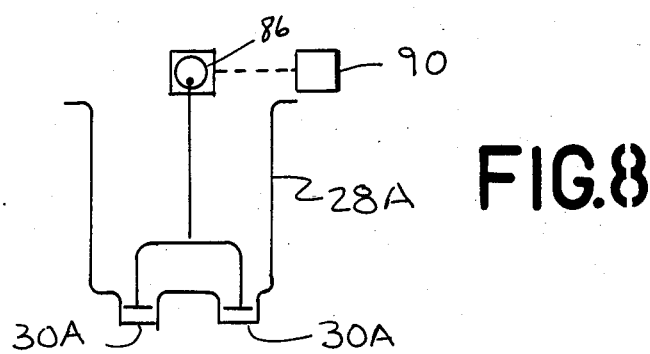
FIG.8
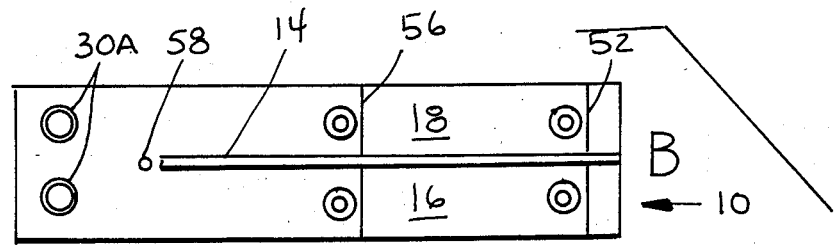
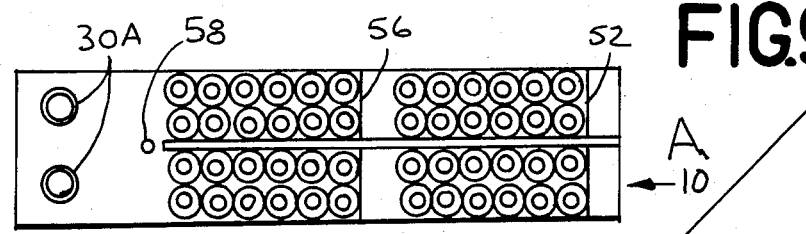
FIG.9

MULTITRACK APPARATUS FOR FRYING FOOD

BACKGROUND OF THE INVENTION

1. Field of the Invention

This invention pertains to a deep fat food fryer having a double cooking track and mechanism to feed food product into the cooking tracks, and to a method of cooking food using a double track deep fat fryer.

2. The Prior Art

The known deep fat cooking devices are either trackless or single track.

The trackless version typically uses a basket; the basket is filled and emptied outside of the cooking vat. The basket is typically loaded with food, manually placed into a cooking vat and hung upon a stationary mounting bracket. The basket is then manually removed and emptied.

The single track deep fat fryers load at one end, send the food along the track to the discharge end and then remove the food. The function of automatic load, flipping of the food product and removal of food product are well known and several structures are available for achieving these functions.

Single track fryers are available for regular size donuts. Other single track fryers are available for miniature donuts. There is not a good all-purpose fryer available for both regular and miniature donuts. One of the problems has been an inability to maintain a first-in, first-out cooking order so that every miniature donut is cooked the right time, specifically enough time but not too much time. When miniature donuts are made on a regular donut fryer, the miniatures tend to become jammed and re-arrange themselves. Some of them don't cook sufficiently, and others overcook.

In the retailing of miniature donuts at fairs, carnivals, picnics, fund raisers, community celebrations, flea markets and other events where people congregate, it is known that people enjoy watching a donut machine make their donuts. Specifically, they want to see and are influenced by the action and entertainment of the donut making machine. When a donut machine is operating, people are drawn by the operation and sales are at a relatively high level. When the machine is not making donuts, more people tend to walk by and do not buy donuts. This is true for both regular and miniature donuts. People like to be entertained and enticed by watching a donut machine.

People also like fresh donuts. They do not want to buy pre-made donuts; they can do this in a service station or convenience store.

One of the problems is that people come and go in surges. A large group will arrive and all want donuts which requires very high production capacity or else a large inventory. People do not want to buy from inventory; they want to buy donuts just-made for them. But, after the crowd is gone, there may be a time with only single customers and only a small quantity of donuts are needed. The single customer also wants to see donuts being made.

The problem is to keep the donut machine operating at all times without building excessive inventory or without running short. Prior donut machines have not been able to satisfy both high and low production rates and keep operating to draw customers.

OBJECT OF THE INVENTION

It is an object of the present invention to provide a double cooking track donut machine that can cook both regular and miniature donuts.

It is an object of the present invention to provide a donut fryer that can easily speed up or slow down its unit rate of production.

It is an object of the present invention to provide a double cooking track food fryer having structure to divert food product in a correct cooking track.

It is an object of the present invention to provide a double cooking track food fryer having a movable diverter barrier for directing food product into a preferred cooking track.

It is an object of the present invention to provide a deep fat food fryer having movable devices for diverting, flipping and removing food product, together with a common actuator linkage for these devices.

It is an object of the present invention to provide a method of deep fat food cooking having diversion of food product into a preferred cooking track.

It is an object of the present invention to provide a method of deep fat food cooking having concurrent propelling of discrete pieces of food product side-by-side down a cooking track.

SUMMARY OF THE INVENTION

According to the principles of the present invention, a double track deep fat food fryer has a cooking vat, a central divider wall dividing the vat into side-by-side cooking tracks, a dispenser for dispensing food pieces into the vat, and structure for propelling the food pieces down each cooking track.

A double track deep fat food fryer has a cooking vat, a central divider dividing the vat into side-by-side cooking tracks, a food piece dispenser above the vat, structure for propelling food pieces through the vat, a diverter barrier which is movable from in front of a first track to in front of the second track, and an actuator for moving the barrier.

A deep fat food fryer has mechanism for dispensing, directing, flipping and removing food product in multiple cooking tracks and a common actuator linkage for the directing, flipping and removing mechanisms.

A method of deep fat cooking a plurality of pieces of food has the steps of dispensing discrete pieces of food into a cooking vat, propelling the pieces downstream in the vat, diverting the pieces into a cooking track on one side of the vat, and keeping the pieces in the track until completion of cooking.

A method of deep fat cooking has the steps of dispensing discrete pieces of food side-by-side into a cooking fat, concurrently propelling the food pieces side-by-side down respective food tracks, and keeping the pieces isolated from each other until completion of cooking and removal from the cooking tracks.

BRIEF DESCRIPTION OF THE DRAWINGS

FIG. 4 is a top plan view in detail of the diverter barrier of FIG. 1;

FIG. 5 is a side elevational view of the detail of FIG. 4;

FIG. 6 is a schematic top view of the structure of FIG. 1 being used for full production of regular donuts;

FIG. 7 is a schematic top view of the structure of FIG. 1 being used for low production of regular donuts;

FIG. 8 is a sectional elevational schematic side view of a dispensing hopper with two outlets for use with the fryer of FIG. 1, FIG. 9 is a schematic top view of the fryer of FIG. 1 being used with the hopper of FIG. 8 for miniature donuts, and FIG. 10 is an end elevational view taken along line X—X of FIG. 2.

DESCRIPTION OF THE PREFERRED EMBODIMENT

Figure 1:
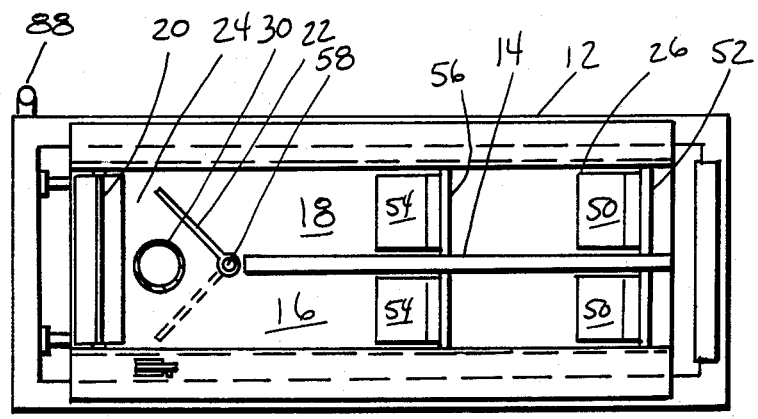
FIG. 1 is a top plan view of a two-track deep fat food fryer according to the present invention.

According to the principles of the present invention, a deep fat food fryer which is schematically illustrated in FIG. 1 and generally indicated by the numeral 10 has a cooking vat 12 for containing deep fat food cooking oil, a central divider wall 14 dividing the vat into an elongate first cooking track 16 and a side-by-side elongate and parallel second cooking track 18, a paddlewheel 20 for circulating cooking oil and propelling food during cooking, and a movable diverter barrier 22 for directing food pieces into either the first track 16 or the second track 18.

The cooking vat 12 has an upstream end 24 which is the loading end used for the beginning of food cooking, and a downstream end 26 which is the unloading end and where the food cooking is completed. Above the upstream end 24 is a food dispensing hopper 28. The hopper has a dispensing outlet 30 located above the upstream end 28 and forward or upstream of the divider wall 14 and the most forward or upstream end of the barrier 22 and rearward of or downstream of the paddlewheel 20. The outlet 30 is centered forward of the divider wall 14.

Within the vat 12 is a fry channel generally indicated by the numeral 32 which has a pair of ledges 34 on each side, a pair of upright side walls 36, and a bottom 38 which is below and spaced from a normal level 40 of cooking oil and which is above and spaced from a vat bottom 42. The divider wall 14 is an inverted U-shaped elongate member having its legs against the channel bottom 38.

The channel 38 has a downstream end 44 abutted against an oil filter 46, and an upstream end 48 in which the paddlewheel 20 and barrier 22 are mounted. In the channel downstream end 48 there is a food remover 50 mounted in each cooking track 16, 18. The removers 50,50 are pivotally mounted on a common cross-shaft 52 and co-rotate with each other to lift cooked food pieces up and out of the vat 12. In the central part of the vat 12 and in the channel 32 is a food flipper 54 in each track 16, 18. The food flippers 54,54 are also hooked together on a common cross-shaft 56 and they co-rotate to lift up and flip over food pieces as the food pieces pass down the cooking tracks 16, 18 and pass the flippers 54.

The barrier 22 is mounted upon a vertical rotary pivot shaft 58 which is supported in a journal 60 in the channel bottom 38. The barrier shaft 58 has a non-circular cross-slot 62 and the barrier has a non-circular cross-pin 64. The barrier 22 slip fits upon the top of the barrier shaft 58 and the cross-pin 64 drops into the cross-slot 62 to positively index the barrier 22 to its shaft 58 and to support the barrier 22 upon its shaft 58. The barrier 22 is supported at a level substantially above the cooking oil level 40 so that cooking oil can freely flow under the barrier 22 but so that food pieces floating in the flowing oil are engaged by the barrier 22 and directed into a proper one of the fry tracks 16, 18.

Figure 2:
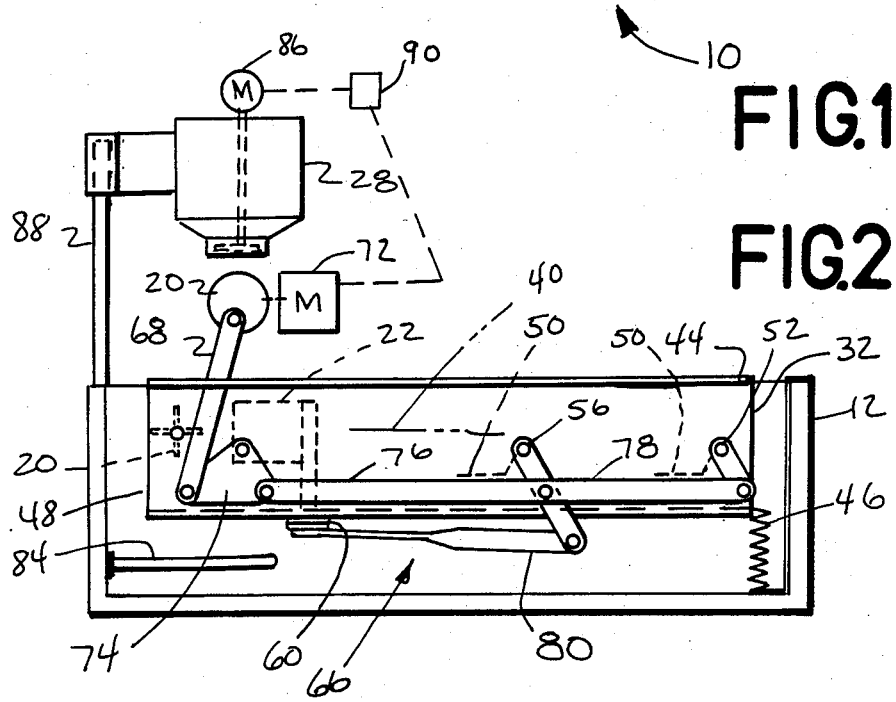
FIG. 2 is a side-elevational sectional view thereof.
Figure 3:
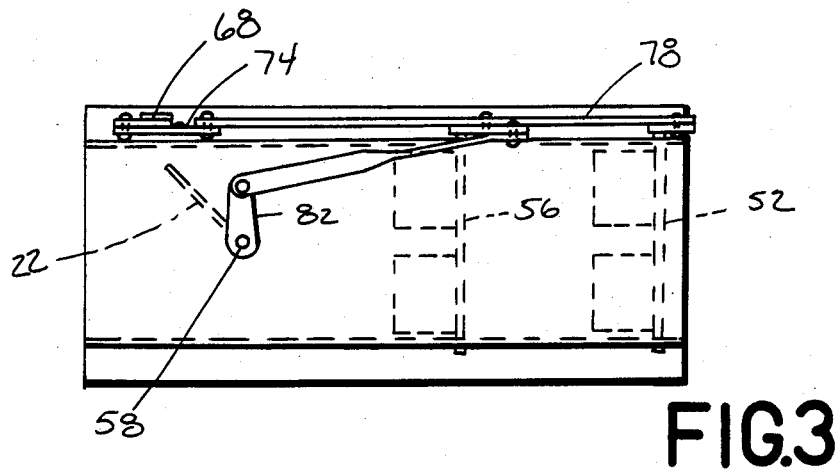
FIG. 3 is a bottom view of an upward looking bottom view taken through lines III—III of FIG. 2.

An actuator mechanism generally indicated by the numeral 66 is connected to the barrier 22, the flippers 54 and the removers 50. The mechanism 66 has a push-pull rod 68 which connects on one end to an eccentric 70 of a gear motor 72 and at an output end to a bellcrank 74 mounted on the channel 32. A drive link 76 carries motion from the bellcrank 74 via a flipper actuator lever 92 to the flippers 54 and a connecting rod 78 from the flipper level 92 connects the flippers 54 and removers 50. A transverse link 80 extends from a distal end 94 of the flipper 92 operatively to a radial arm 82 off of the barrier shaft 58. The distal lever and 94 extends to a level below the channel bottom 38, and the transverse link 80 and arm 82 are both underneath the fry tracks 16, 18 and underneath an imperforate section of the channel bottom 38 so that falling cooking debris cannot get in the mechanism 66 and so that food pieces cannot be caught in the mechanism 66 as is clearly shown in FIGS. 2 and 10. Underneath the channel bottom 38 is a heating element 84 for heating cooking oil in the vat 12.

The paddlewheel 20 spans the full width of the fry channel 32 and both of the fry tracks 16, 18. As the paddlewheel 20 revolves it propels cooking oil and food pieces floating therein down the fry tracks 16, 18. The oil filter 46 spans the full width of the fry channel 32 and both of the fry tracks 16, 18. All cooking oil and debris from both fry tracks 16, 18 is passed through the single oil filter 46. As the cooking oil is drawn back between the channel bottom 38 and vat bottom 42 the oil is reheated by the single heating element 84 which commonly heats the oil for both fry tracks 16, 18.

The dispensing hopper 28 has its own discrete drive motor 86 which is under the control of a machine controller 90 also operatively connected to the mechanism motor 72. The hopper 28 is mounted upon a rotary pedistal 88 and may be swung away from its normal position above the vat 12. The paddlewheel 20 is connected to a separate and continuously operating motor (not shown) so that the paddlewheel 20 continually rotates and propels cooking oil down the fry tracks 16, 18.

An alternative dispensing hopper 28A is shown in FIGS. 8 & 9. The alternative hopper 78A has two side-by-side dispensing outlets 30A. The two outlets 30A are spaced from each other the same distance as the centerlines of the fry tracks 16, 18 and an outlet 30A is centered in front of each fry track 16, 18 as best shown in FIG. 9.

In operation of the fryer 10 and in the use of the fryer 10 to practice the method of the present invention, the hot cooking oil is propelled and circulated down both fry tracks 16, 18 by the paddlewheel 20.

FIG. 6 best illustrates normal production of regular donuts at the maximum capacity of the fryer 10. In FIG. 6A the flippers 54 and removers 50 are up and the barrier 22 is in front of and covers the entry to the second track 18. A piece of food, for example a donut D1 is dropped from the hopper outlet 30 downstream of the paddlewheel 20 and directly in front of the divider wall 14. The barrier 22 directs the floating donut D1 into the first fry track 16. The mechanism motor 72 then halfcycles and the flippers 54 and removers 50 are lowered and the barrier 22 is moved to in front of the first fry track 16 as shown in FIG. 6B. The hopper outlet 30 then drops a donut D2 in the same place as previously dropped donut D1. The barrier 22 contacts the second donut D2 and directs it into the second fry channel 18. The donuts D1, D2 all float on the moving cooking oil and are carried down their respective fry tracks 16, 18 and kept separate. Eventually the fry tracks 16, 18 will fill up with donuts D1, D2 as shown in FIG. 6C. Each time the flippers 54 come up a donut in each track 16, 18 is lifted up and flipped over but kept in its respective track. The remover 50 lifts up and removes a donut from each track 16, 18 as it operates upwardly. By using the timing of the dispensing from the hopper 28 to the timing of the operation of the mechanism 66, as many as sixteen donuts at a time can be cooked or fryed in the fryer 10.

FIG. 7 schematically shows a low production or "skip" cycle cooking of donuts. The controller 90 is adjusted so that it dispenses a donut D1 when the flipper 54, remover 50 and barrier are as shown in FIG. 7A, but skips or does not dispense when the flipper 54, remover 50 and barrier are in the positions shown in FIG. 7B. As seen in FIG. 7C, all of the donuts are now cooked only in the first fry track 16. With this structure and by this method of operating the fryer 10, the production of donuts can be decreased to as few as two in the vat 12.

FIG. 9 is a schematic of the barrier 22 removed and the double outlet or dual hopper 28A in place. This alternate embodiment may be used for regular donuts but is ideally suited for miniature donuts, commonly called "mini-donuts". Both outlets 30A dispense simultaneously, one in front of each fry track 16, 18. The circulating oil carries the floating donuts down the tracks 16, 18 and they nest side-by-side in the fry tracks 16, 18. Each cycle of the flippers 54 flips two mini donuts in each fry track 16, 18 or a total of four donuts per cycle. Each cycle of the remover 50 removes two donuts from each fry track 16, 18 or four donuts per cycle. With this method up to forty-eight donuts can be cooked simultaneously.

FIG. 9B shows the skip cycle for mini-donuts where the timing of the hopper 28A is turned down to a very slow rate and four donuts are cooked at one time.

This fryer 10 is a very capable apparatus and it's exciting to watch. The method of this invention enables either low speed or high speed production of donuts and gives the public a very interesting show to watch and smell. The fryer 10 is virtually failure proof and evenly cooks all food pieces and does not overcook, or undercook or get food pieces fused together.

Although other advantages may be found and realized, and various and minor modifications suggested by those versed in the art, be it understood that I wish to embody within the scope of the patent warranted hereon, all such embodiments as reasonably and properly come within the scope of my contribution to the art.

I claim as my invention:

1. A deep fat food fryer having a mechanism for dispensing, directing, flipping and removing food product in multiple cooking tracks of the fryer, comprising
    (a) a deep fat cooking vat having two adjacent side by side parallel cooking tracks;
    (b) a food dispensing device above an upstream end of the fryer;
    (c) a diverter barrier upstream of the two tracks and downstream of the dispensing device for directing dropped food product from where the food was dropped by the dispensing device into one or the other of the tracks;
    (d) a flipper downstream of the barrier for flipping food product in both of the cooking tracks;
    (e) means downstream of the flipper for finally removing cooked food products from both cooking tracks;
    (f) an actuator linkage immersed in the cooking oil and connecting all of the barrier, the flipper and the final removing means to a common remote single source of motive power with a single rod extending up and out of the vat to said power source; and
    (g) a channel in the vat, said channel having an imperforate bottom separating the cooking tracks from the linkage so that no food pieces can get in the linkage.

2. A fryer according to claim 1, in which the linkage includes a transverse link extending under one of cooking tracks and which is connected to a radial arm on a rotatable vertical shaft to which the barrier is connected, said arm being below and under one of the cooking tracks.

3. A fryer according to claim 2, in which the shaft is rotatably mounted in a journal in the imperforate bottom.

4. A double track deep fat food fryer, comprising
    (a) a cooking vat for fluidly containing cooking oil, said vat having a bottom, a pair of opposed sides and upstream and downstream opposed ends;
    (b) an inverted hat-section shaped elongate fry channel in and supported by the cooking vat, said channel having a planar bottom below the normal level of cooking oil and spaced above the vat bottom at a level about midway there between;
    (c) an immersion type heater element in the cooking vat and in between the vat bottom and the channel bottom, said element being fixed to the vat;
    (d) a central elongate divider wall dividing the channel and the vat into elongate side-by-side first and second cooking tracks; said divider wall being secured to the channel and being abutted against the channel bottom;
    (e) means above the upstream end of the vat and directly above an upstream end of the channel bottom for dispensing discrete pieces of food product into the upstream end of the vat and onto cooking oil above the upstream end of the channel bottom;
    (f) a movable diverter barrier mounted to the channel forward of an upstream end of the divider wall, said barrier being pivotable from a first position in front of the first track to a second position in front of the second track and vice-versa;
    (g) a barrier drive mechanism in the vat on an underside of the channel bottom and between the channel and the vat bottom, said mechanism being operatively connected to said barrier with an upright barrier shaft extending through a journal in the channel bottom to said barrier;
    (h) a motor on the exterior topside of the vat for providing motive power for the actuator mechanism; and
    (i) a connecting mechanism mounted to and outside of the channel, said connecting mechanism having one end connected to the barrier drive mechanism and a second end extending up and out of the vat, said second end being connected above and on the outside of the vat to the motor.

5. A double track food fryer according to claim 4, in which (a) the upstream end of the channel bottom is spaced inward in the vat from the upstream vat end, a downstream end of the channel bottom is spaced from the downstream vat end, and the heater element is under the upstream end of the channel bottom; and including (b) a single oil filter for both said first and second cooking tracks, said filter being on the downstream end of both cooking tracks and being abutted against the downstream end of the channel bottom, said divider wall extending to the filter, said filter spanning across the width of both tracks;

(c) a paddlewheel oil pump in the vat upstream end for propelling cooking oil and food pieces in each track in a circulation flow above the channel bottom from the vat upstream end to the vat downstream end, said paddlewheel being mounted in and spanning the width of the channel and having its oil inlet in the spacing between the channel bottom and the vat upstream end, said paddlewheel being upstream of the divider wall and the diverter barrier and in front of both cooking tracks, and in which (d) the path of the oil flow extends in a circular loop from the paddlewheel down the channel on top of the channel bottom, then downward through the space between the downstream end of the channel bottom and the downstream vat end, then downward through the oil filter, then forward between the vat bottom and the channel bottom and over the heating element, and then immediately after heating up through the oil inlet to the paddlewheel.

6. A double track food fryer according to claim 4, in which the movable diverter barrier is substantially above the normal level of cooking oil in the vat, said barrier being mounted upon said barrier shaft, said barrier shaft being a rotatable vertical shaft and which is rotatable in said journal, said journal and said shaft being upstream of the divider wall, said barrier being slip fitted upon the shaft from above and being radially indexed to the shaft by a cross-pin in a barrier hub, said cross-pin being slip fitted from above into a cross-slot on the top end of the barrier shaft.

7. A double track food fryer according to claim 4 said channel bottom being imperforate, and including a mechanism having (a) a food flipper downstream of the barrier and generally in the center of the channel, said flipper being pivotally mounted in the channel and having a downward extending actuator lever along and outside of the channel;

(b) an upright rotatable shaft journaled in the channel bottom, said shaft having a radial arm extending transversely under the channel bottom, said diverter barrier being mounted on top of the shaft;

(c) a distal end on the flipper actuator lever, said distal end extending to a level below the channel bottom;

(d) a transverse barrier drive link under the channel bottom from the distal end to the radial arm, and in which (e) the radial arm and barrier drive link are in a cooking oil return passageway underneath of said channel bottom and downstream of an oil filter, so that food pieces cannot be caught in the mechanism.

* * * * *